US012436534B2

(12) United States Patent
Creaby et al.

(10) Patent No.: US 12,436,534 B2
(45) Date of Patent: Oct. 7, 2025

(54) FUSING OBSTACLE DATA FOR AUTONOMOUS VEHICLES

(71) Applicant: Trimble Inc., Sunnyvale, CA (US)

(72) Inventors: Justin Creaby, Westminster, CO (US);
Joshua Rands, Westminster, CO (US);
Riley Kenyon, Westminster, CO (US)

(73) Assignee: Trimble Inc., Westminster, CO (US)

( * ) Notice: Subject to any disclaimer, the term of this patent is extended or adjusted under 35 U.S.C. 154(b) by 269 days.

(21) Appl. No.: 17/899,152

(22) Filed: Aug. 30, 2022

(65) Prior Publication Data
US 2024/0069552 A1 Feb. 29, 2024

(51) Int. Cl.
*G05D 1/00* (2024.01)
*A01D 90/00* (2006.01)

(52) U.S. Cl.
CPC ......... *G05D 1/0214* (2013.01); *G05D 1/0238* (2013.01); *G05D 1/0257* (2013.01); *G05D 1/0276* (2013.01); *A01D 90/00* (2013.01)

(58) Field of Classification Search
CPC .. G05D 1/0214; G05D 1/0238; G05D 1/0257; G05D 1/0276; A01D 90/00; A01D 43/087; A01D 75/185; A01D 75/20; G01S 17/86; G01S 13/865; G01S 13/88; G01S 13/931; G01S 17/88; G01S 17/933; G01S 17/931
USPC .......................................................... 701/3
See application file for complete search history.

(56) References Cited

U.S. PATENT DOCUMENTS

| 2012/0215394 | A1* | 8/2012 | Wang ................... A01B 69/008 |
| | | | 701/50 |
| 2013/0166157 | A1* | 6/2013 | Schleicher ........... A01D 43/086 |
| | | | 701/50 |
| 2016/0157414 | A1* | 6/2016 | Ackerman ................ G01S 5/16 |
| | | | 701/25 |
| 2019/0173196 | A1* | 6/2019 | Achour ................. G01S 13/865 |
| 2021/0357664 | A1* | 11/2021 | Kocer .................. A01B 69/008 |
| 2023/0020432 | A1* | 1/2023 | Bennett ..................... G06T 7/70 |
| 2023/0154199 | A1* | 5/2023 | Lee ......................... G06V 20/58 |
| | | | 701/24 |
| 2023/0243952 | A1* | 8/2023 | Wang ................... G01S 13/865 |
| | | | 342/195 |
| 2024/0032474 | A1* | 2/2024 | Ritter ................... A01B 79/005 |

FOREIGN PATENT DOCUMENTS

EP    3414982 A1 *  12/2018  ........... A01B 69/001

OTHER PUBLICATIONS

Extended European Search Report for Application No. 23193081.9-1206, date of completion of the search Jan. 11, 2024, 11 pages.

* cited by examiner

*Primary Examiner* — Tiffany P Young
*Assistant Examiner* — Ashleigh Nicole Turnbaugh
(74) *Attorney, Agent, or Firm* — Kilpatrick Townsend & Stockton LLP

(57) ABSTRACT

Disclosed are a method and apparatus for avoiding collisions with obstacles by a first vehicle using sensors on an accompanying second vehicle. The second vehicle navigates proximate the first vehicle while aiming an obstacle detection sensor at a path of the first vehicle to detect objects in the path of the first vehicle. The locations of the objects are determined and transmitted to the first vehicle.

15 Claims, 6 Drawing Sheets

FUSING OBSTACLE DATA FOR AUTONOMOUS VEHICLES

BACKGROUND OF THE INVENTION

The present invention relates to autonomous navigation, and in particular such navigation for farm equipment.

There have been many advances in autonomous navigation for vehicles that travel on roads. In particular, systems have been developed to recognize where the road and lane lines are, to recognize stop lights and other traffic signals, etc. However, off-road vehicles, such as farm equipment, travel in fields without roads or traffic signals, and upon ground that may be uneven and has vegetation directly in front of the equipment, such as crops to be harvested by the equipment. Accordingly, autonomous navigation for farm equipment presents a different set of challenges. In particular, it is a challenge to identify obstacles in the path of the equipment since the path is not a recognizable road. In addition, visibility is often poor because of the crops being harvested, which can obscure a person or animal in the field in the path of the harvester. In addition, the harvester kicks up dust, further diminishing visibility.

It would be desirable to have a collision avoidance system that handles the unique challenges of off-road vehicles such as farm equipment. As such, new systems, methods, and other techniques are needed to address these and other issues.

Unless otherwise indicated herein, the materials described in this section of the Specification are not prior art to the claims in this application and are not admitted to be prior art by inclusion in this section.

BRIEF SUMMARY OF THE INVENTION

In embodiments, a method and apparatus are provided for avoiding collisions with obstacles by a first vehicle using sensors on an accompanying second vehicle. The second vehicle navigates proximate the first vehicle while aiming an obstacle detection sensor at a path of the first vehicle to detect objects in the path of the first vehicle. The locations of the objects are determined and transmitted to the first vehicle.

An advantage of embodiments of the invention is that a second vehicle may have a clearer view of obstacles than the first vehicle. This is an advantage for farm equipment, such as harvesters that may have sensors blocked by dust and the crops themselves.

In embodiments, the first vehicle also has an object detection sensor, and can determine object locations. The data on the location of the objects from the two vehicles is fused, with the second vehicle data having a different, usually higher weighting. The weighting can be varied based on an amount of noise, dust or other interference with the data. The noise can be determined using the same sensors, or additional sensors. In one embodiment, the first vehicle has a radar sensor, which is better at penetrating dust, and the second vehicle has a lidar sensor, which provides more accuracy.

In embodiments, the sensor data is filtered to remove images of the crop (e.g., reflections from wheat are removed). In one embodiment, the second vehicle is a cart for holding a harvested crop. Since the closeness of the two vehicles may vary, a proximity sensor determines the proximity of the two vehicles, which is used to modify the location of the object with respect to the second vehicle to convert it into a location of the object with respect to the first vehicle.

In embodiments, the second vehicle is a flying vehicle (e.g., drone). In embodiments, the sensor data from the second vehicle can be sent to the first vehicle in raw form for processing to determine object locations, or the second vehicle can process the data and send the location relative to the first vehicle.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF THE INVENTION

Figure 1:
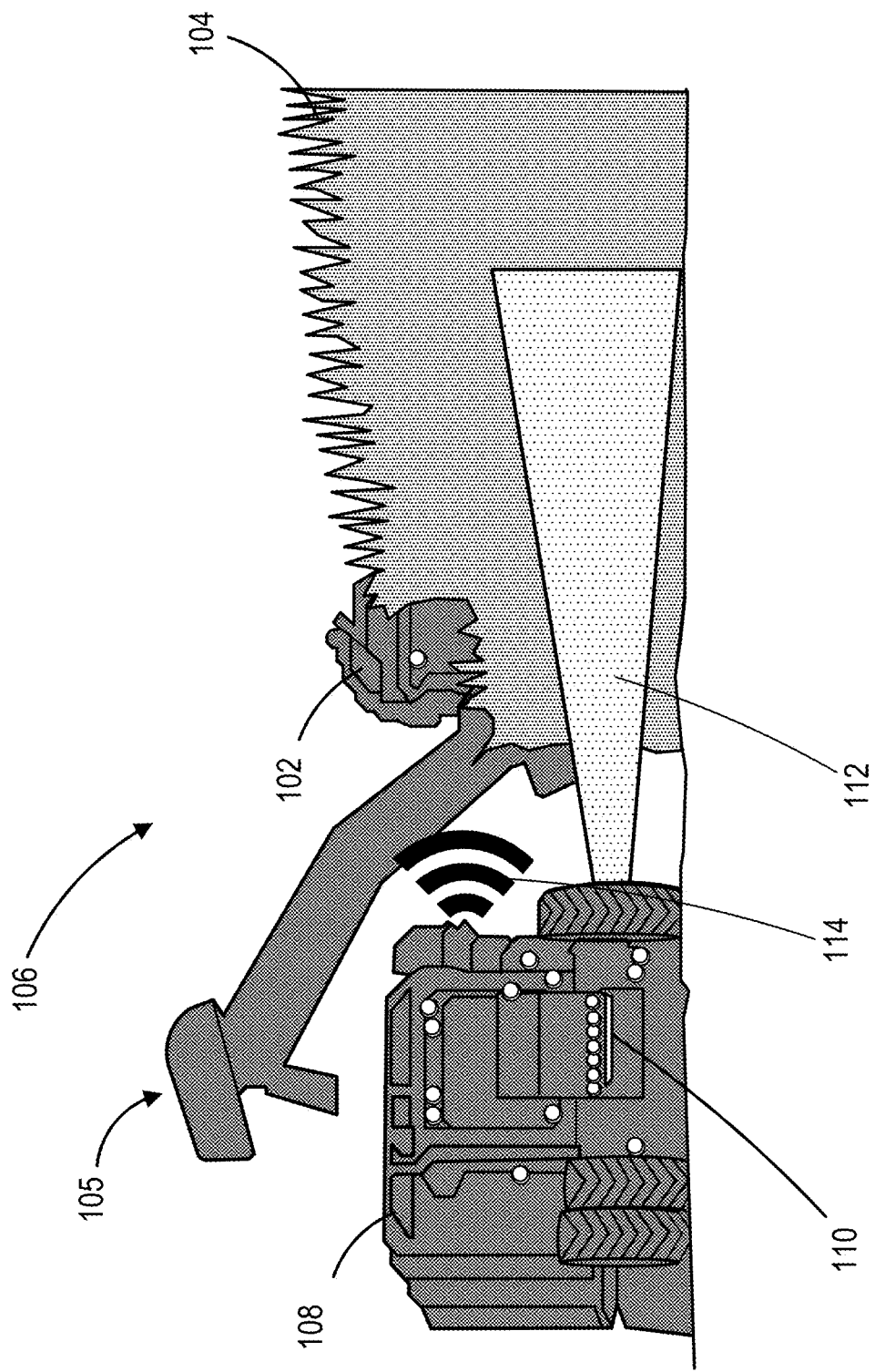
FIG. 1 is a diagram of a harvester with an adjacent grain cart with a sensor, according to embodiments.
Figure 2:
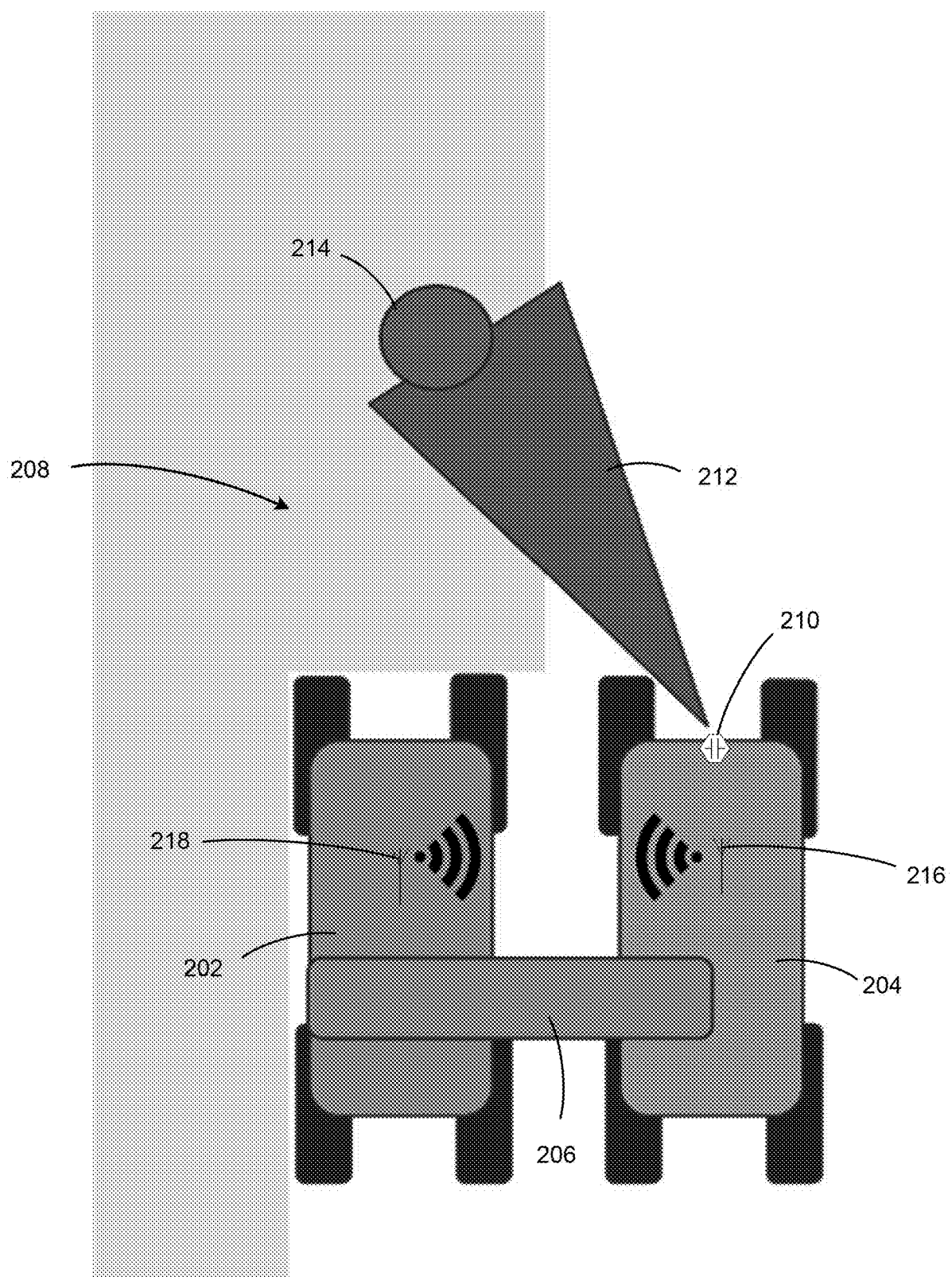
FIG. 2 show a top view of two vehicles with a sensor on the second vehicle, according to embodiments.
Figure 3:
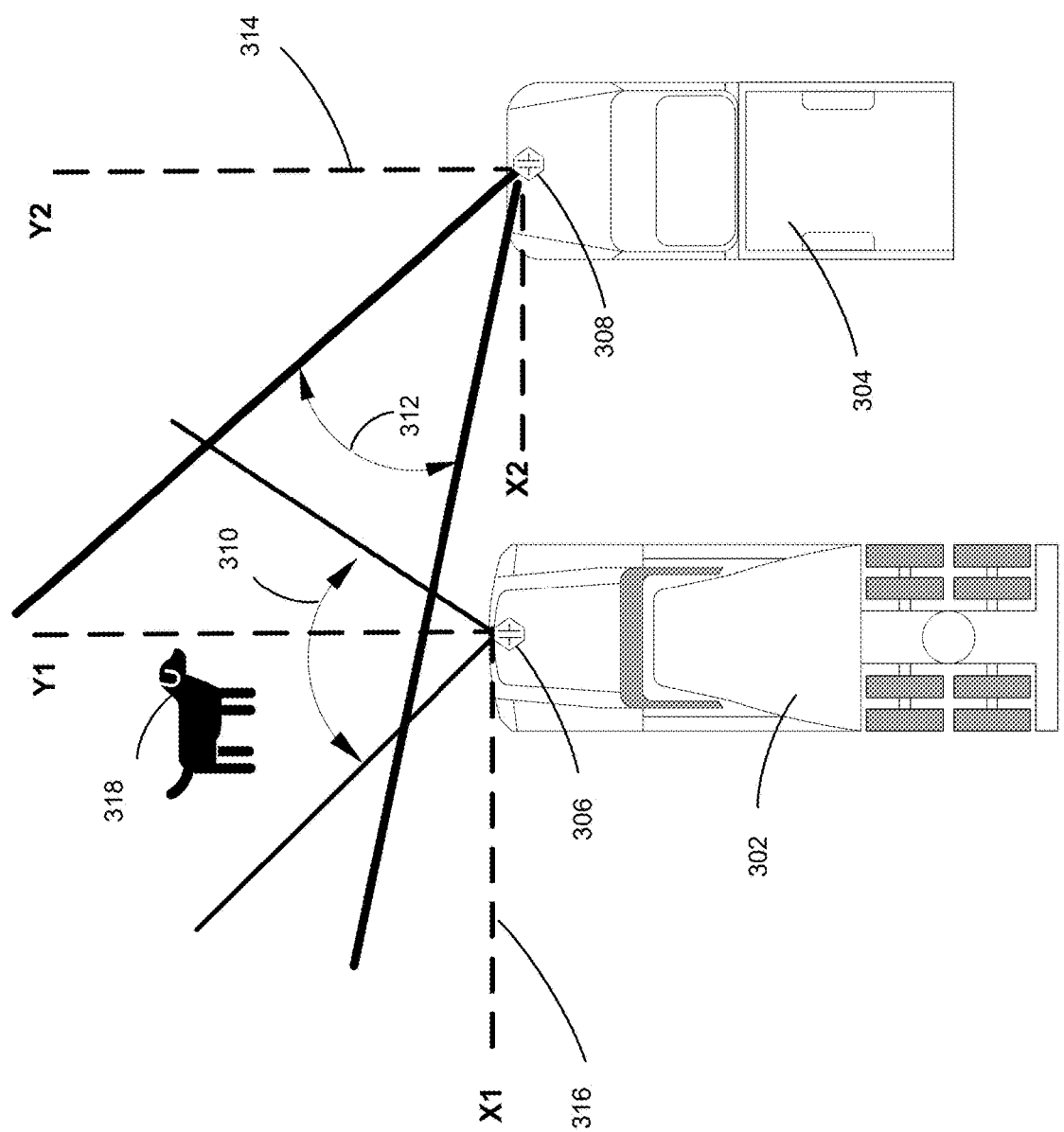
FIG. 3 is a diagram of a potential obstacle position relative to the different coordinate frames of first and second vehicles.
Figure 5:
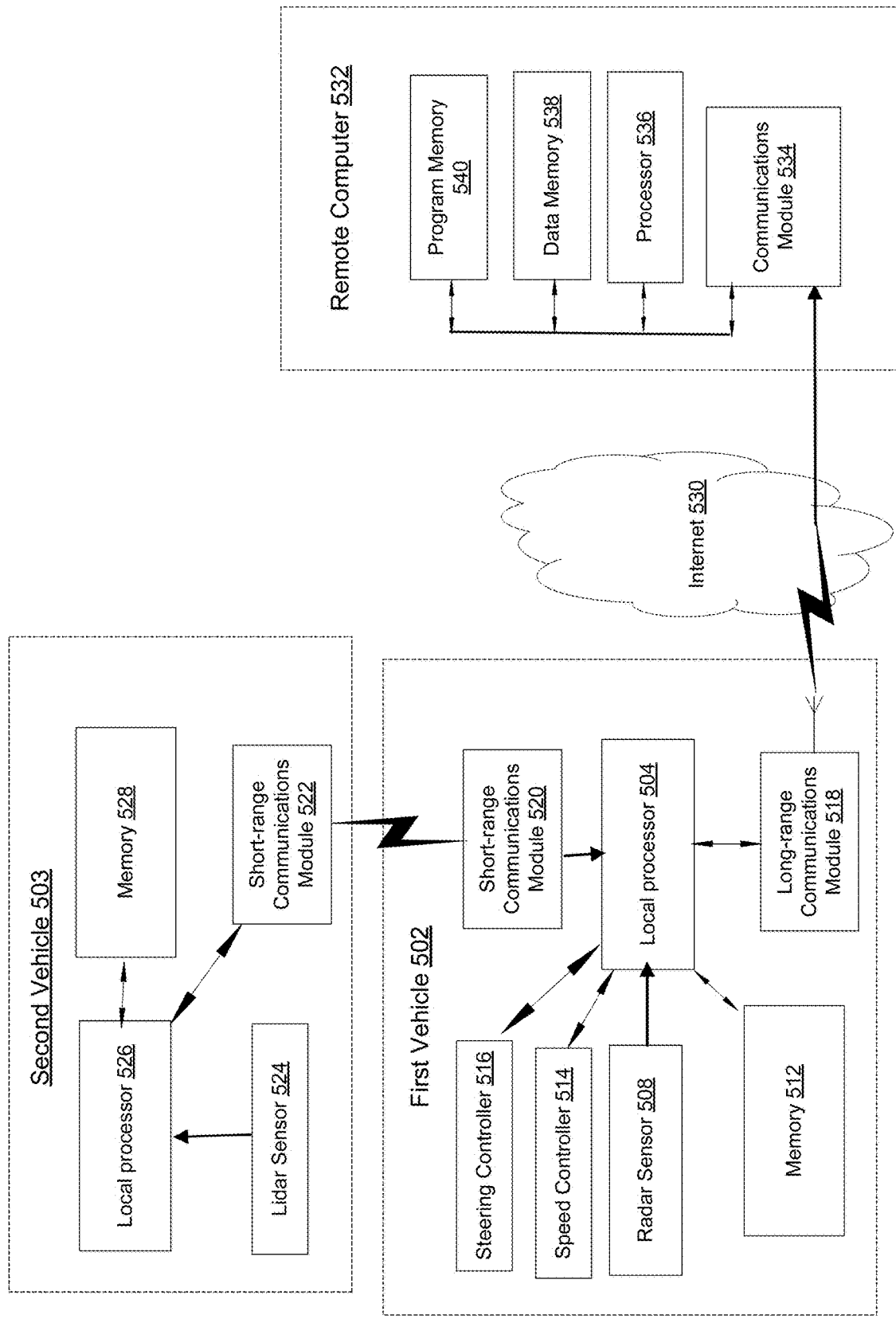
FIG. 5 is block diagram illustrating the division of processing between two vehicles and the cloud, according to embodiments.

Disclosed are techniques for avoiding collisions with obstacles by a vehicle, in particular an off-road vehicle. FIG. 1 illustrates a second vehicle (grain cart) with a view outside the crop and with less dust compared to a first vehicle (harvester). FIGS. 2-3 illustrates the FOV of the second vehicle from above. FIG. 5 illustrated the electronics on the two vehicles. The obstacle detection data from the second vehicle's sensor 524 is provided to the first vehicle 502 and may be fused with data from the first vehicle's sensor 508.

Location of Sensor on Second Vehicle

FIG. 1 is a diagram of a harvester with an adjacent grain cart with a sensor, according to embodiments. A harvester 102 is harvesting a grain crop 104. The process kicks up a cloud of dust and grain particles 106. A grain cart 108 drives alongside harvester 102 to receive the harvested grain. The dust obscures the vision of any obstacle sensor on harvester 102. While a radar sensor can penetrate dust to some extent, a more accurate lidar sensor may be essentially blinded.

In embodiments, a sensor 110 is mounted on grain cart 108, and is angled so that its field of view (FOV) 112 includes an area in front of harvester 106. Sensor 110 could be a lidar sensor, which would be mostly outside the cloud of dust 106 and thus have a clearer view of obstacles in front of harvester 102. Data from sensor 110 is communicated via a wireless connection 114 to harvester 102, which can stop, slow, turn, or take other appropriate action when an obstacle is detected.

In embodiments, sensor 110 is mounted lower on grain cart 108 than a sensor on harvester 102. The lower mounting of the sensor, in addition to being out of a dust cloud, allows it to see through the stalks of a crop where there is less obstruction due to crop leaves, which are higher up. Alternately, or in addition, the grain cart can have a much higher sensor that can look down on the crop, with a decent view from above. In another embodiment, instead of mounting a sensor on a second vehicle, or in addition, a sensor can be mounted on the top of an unloading auger 105. In some embodiments, the grain cart is pulled by a separate vehicle which is thus almost completely in front of the harvester. The sensor can thus be mounted on the side of this pulling vehicle.

Sometimes the obstacle may be an animal or a person, and the harvester needs to slow so they can get out of the way, or the harvester can stop if they are close or run toward the harvester. In addition to avoiding harm, it can contaminate the grain if an animal is pulled into the harvester and remains end up in the grain cart. This is especially problematic for grains to be marketed to vegans or vegetarians. Other obstacles may be stationary obstacles, such as a fence or shed or other structure at the end of a field. In such a case, the harvester will turn before colliding.

The harvester and grain cart are just one example of where a sensor for a first vehicle is placed on a second vehicle. Alternately, multiple harvesters may move through a field in parallel. Each could have its own sensor, and a second sensor angled to the area in front of the other harvester. Although both will be subject to obscured views due to dust, the data can be combined or averaged to provide a better view of obstacles. Also, the angled sensors may be placed at the outer edge of each harvester, so that they are near the edge of the dust cloud, and thus less obscured. In another example, the second vehicle can be a drone or other flying vehicle. This provides more options for selecting a position with a less obscured view. For example, the drone can fly directly in front of a harvester, with a sensor pointing directly downward over the area immediately in front of the harvester. This will provide a clearer view of any objects, such as animals, in-between crop rows.

FIG. 2 show a top view of two vehicles with a sensor on the second vehicle, according to embodiments. A first vehicle 202 and a second vehicle 204 are moving proximate each other with an auger 206 on vehicle 202 loading the harvested crop into vehicle 204 or a grain cart pulled by vehicle 204. Vehicle 202 is harvesting a crop 208, and vehicle 204 has a sensor 210 with a FOV 212 in front of vehicle 202. Sensor 210 can detect an object 214 in front of vehicle 202 in the crop 208. This data is wirelessly communicated from a transceiver 216 on vehicle 204 to a transceiver 218 on vehicle 202. This communication can be over WiFi or any other short range communication system.

As can be seen in FIG. 2, sensor 210 on second vehicle 204 has advantages beyond being out of the cloud of dust of vehicle 202. Because vehicle 204 is in a clear area outside crop 208, there is a clear line of sight up to the edge of the crop. Sensors on both vehicles can see through the crop to some extent, but sensor 210 has less crop to see through since its FOV enters the crop from the side. This is also true of a drone sensor, which sees the crop from above, and can see between rows of grain.

FIG. 3 is a diagram of a potential obstacle position relative to the different coordinate frames of first and second vehicles. A first vehicle 302 and a second vehicle 304 are shown, with respective sensors 306 and 308. Sensor 306 has a FOV indicated by angle 310, and sensor 308 has a FOV indicated by angle 312. Sensor 308 points to the side, so that the FOVs of the two sensors overlap in front of the first vehicle 302. Sensor 308 detects the location of objects with respect to a coordinate frame 314, while sensor 306 detects objects with respect to a coordinate frame 316. Thus, an obstacle 318 will be detected by both sensors, but will be at different X, Y positions with respect to the two sensors.

When sensor 308 provides its position information to the first vehicle, the position must be adjusted to be in the coordinate system of sensor 306 on the first vehicle. This is done in one embodiment by determining the X, Y distance of sensor 306 from sensor 308, and subtracting that distance. The relative positions of the two sensors can be determined through a number of means. GPS data could be used, alone or augmented with other sensors. Each vehicle can have a side proximity sensor that can identify the position of the front of the other vehicle. The sensor location on the other vehicle relative to the side and front of the vehicle is known upon assembly, and stored in memory. This can also include a rotation, not just a translation. Generally this process is a "coordinate frame transform" and is solved by applying a rotation and translation in one reference frame to get another frame.

In embodiments, the first vehicle does not have a sensor at all, and relies on one or more sensors on the second vehicle. This simplifies the processing, eliminating the need to fuse obstacle data. The obstacle position still needs to be converted into the coordinate system of the first vehicle for navigation. Alternately, the first vehicle also has an object detection sensor, and can determine object locations. The data on the location of the objects from the two vehicles is fused, with the second vehicle data having a different, usually higher weighting. The data can be fused by aggregating obstacles into a single frame and running estimation techniques to weight the measurements based on the reliability of their source. The weighting can be varied based on an amount of noise, dust or other interference with the data. The noise can be determined using the same sensors, or additional sensors, such as a dust sensor using an infrared light beam and detector to determine dust interference. In one embodiment, the first vehicle has a radar sensor, which is better at penetrating dust, and the second vehicle has a lidar sensor, which provides more accuracy. In another embodiment, the second vehicle has both a radar and a lidar sensor.

In embodiments, where the second vehicle is a drone, a camera sensor may also be provided. Images of potential obstacles can be transmitted to the first vehicle for display, along with an indication of location with respect to the first vehicle. The display can be a navigation grid display, with an indicator for obstacles and pop-up bubbles with camera images of the obstacles from above.

Processing on Second Vehicle

In embodiments, all the processing is done on the second vehicle, eliminating the need to convert location data into the coordinate system of the first vehicle. The second vehicle tracks not only potential obstacles, but also the first vehicle, and determines which obstacles may be in its path. The speed of the first vehicle is also tracked. The second vehicle can then determine whether the first vehicle needs to slow down, turn, or stop. The second vehicle then transmits the appropriate navigation instructions to the first vehicle.

Crop Filtering

In embodiments, the sensor data is filtered to remove images of the crop (e.g., reflections from wheat are removed). Sensor data can generally be pre-processed and run through spatial/temporal algorithms to produce a more reliable obstacle list. In the case of crop filtering—if the sensor is a camera, it can do feature detection and tracking. Filtering radar returns from the crop involves characterizing the signal to noise ratio (SNR). The crop should have a lower signal to noise ratio than other objects, and could be pre-processed out before running the obstacle detection pipeline.

Multiple Sensors

In some embodiments, multiple sensors could be used on one or both vehicles. The sensor information can be combined in multiple ways. A computer can use the most conservative obstacle collision information from all the sensors to determine if the vehicle must slow or stop. Alternately, the information could be averaged, to provide an averaged position of each object. Other combinations are also possible. In one embodiment, a Lidar sensor on the second vehicle can be used to tune a radar sensor on the first vehicle by adjusting the filter parameters of the radar sensor.

Obstacle Fusing Method

Figure 4:
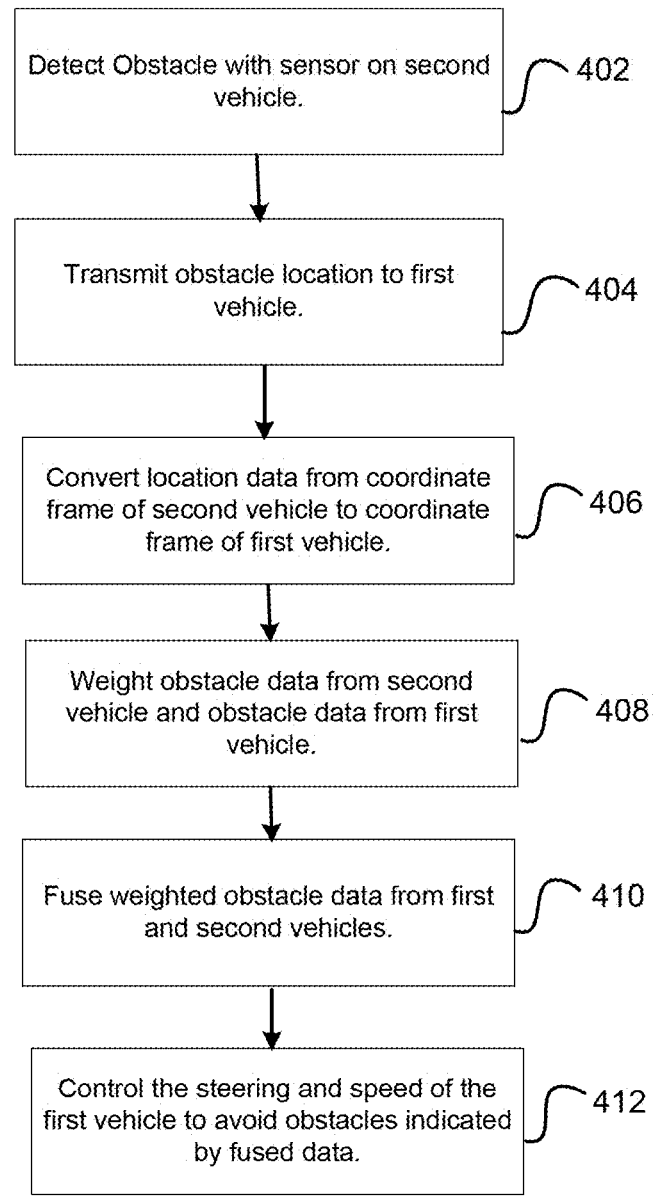
FIG. 4 is a diagram of potential obstacle X, Y position relative to an off-road vehicle, according to embodiments.

FIG. 4 is a flow chart of the fusing steps according to embodiments. In step 402, an obstacle is detected with a sensor on a second vehicle. Next, the second vehicle transmits the obstacle location to the first vehicle (404). The location data from the coordinate frame of the second vehicle is converted into the coordinate frame of the first vehicle (406). The obstacle data from the second vehicle and the obstacle data from the first vehicle are weighted (408). The weighted obstacle data from the first and second vehicles is fused (410). The fused obstacle data is used to control the steering and speed of the first vehicle to avoid obstacles indicated by fused data (412).

Multi-Vehicle Processing

FIG. 5 is block diagram illustrating the division of processing between two vehicles and the cloud, according to embodiments. A first vehicle 502 has a processor 504 and one or more sensors, such as a radar sensor 506. Local processor 504 receives the sensor data and calculates the path for the vehicle and the times to slow down or stop to avoid obstacles. A memory 512, which can be multiple memories, stores the data and software programs. Based on the processor calculations, appropriate control signals are sent to a speed controller 514 and a steering controller 516.

A long-range communications module 518 provides communications over the internet 530 and/or other networks, to a remote computer 532. A short-range communications module 520 provides communications with a second vehicle 503 and its communications module 522. This communication can be over WiFi or any other short range communication system. Second vehicle 503 has a lidar sensor 524 which provides sensor data to its own processor 526 for storing in memory 528, which can be multiple memories, including a program memory. Either raw or processed lidar sensor data is provided to communications module 522 for transmission to first vehicle 502.

Remote computer 532 has its own communications module 534, processor 536, data memory 538 and program memory 538. Data memory 538 can store the characteristics of each type of vehicle, including performance data in dusty conditions for different types of crops and locations. Appropriate sensor filter settings can then be determined and downloaded to the vehicle 502 memory 512.

The remote computer can be a server, or can be a farmer's computer used to control the farm equipment. A pre-planned path can be generated and wirelessly transmitted using the communications modules to the vehicle 902. The wireless transmission can be over a mobile phone network, via WiFi, etc.

In one embodiment, two vehicles can share information about obstacles in front of each other. For example, two vehicles on a road that are passing each other can not only share information about where they are going, any plans to turn or change lanes, etc., but can also share information about obstacles in front of or adjacent the other vehicle. For example, one vehicle may have its view block by a vehicle in front, and might not see a rock, crashed car, or other stationary vehicle in front of the vehicle in front of it. The vehicle to one side may have a better view, and can share this information.

Computer System

Figure 6:
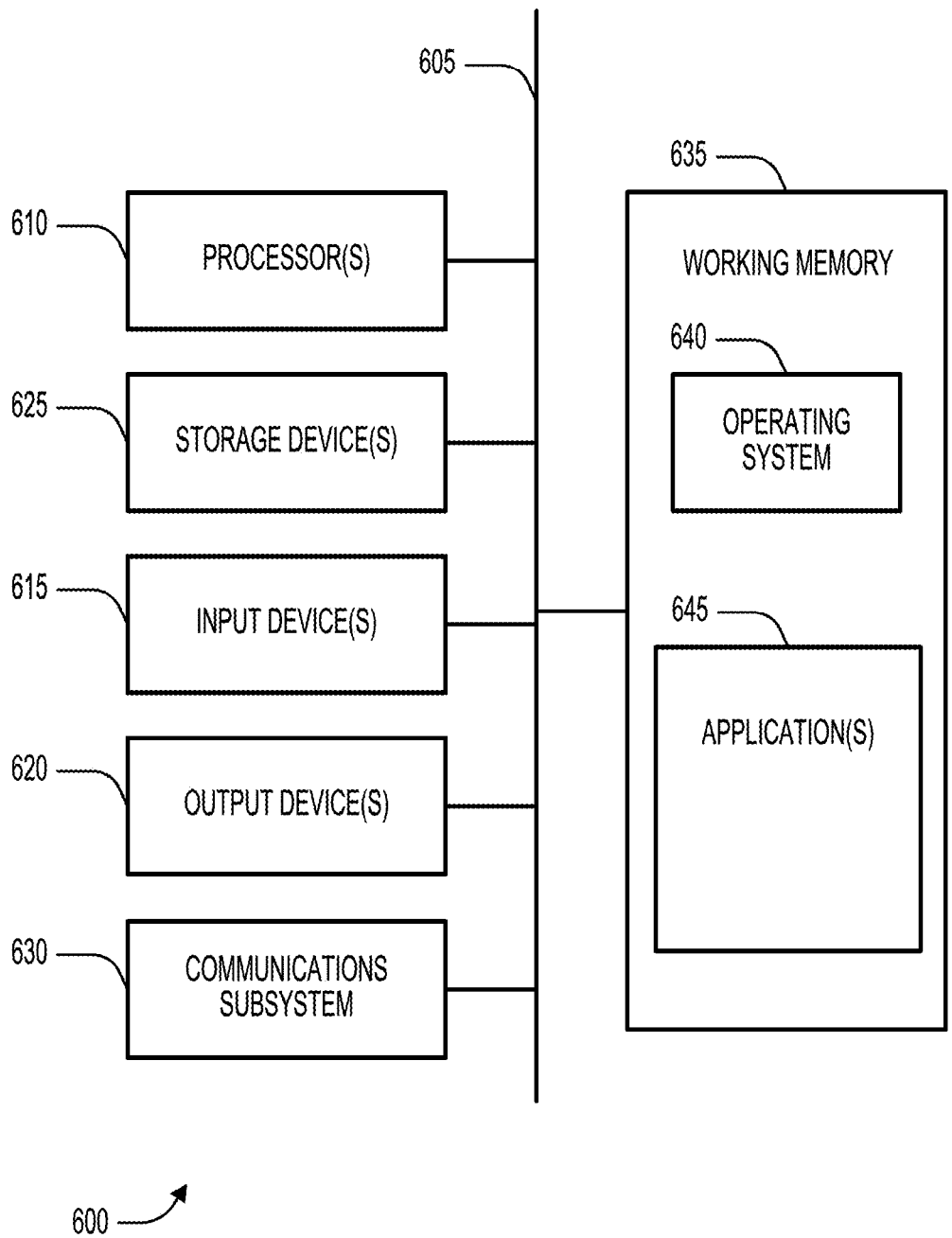
FIG. 6 illustrates a simplified computer system for implementing vehicle collision avoidance controls, according to embodiments.

FIG. 6 illustrates a simplified computer system 600, in accordance with some embodiments of the present disclosure. FIG. 6 provides a schematic illustration of one embodiment of computer system 600 that can perform some or all of the steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or more integrated manner.

Computer system 600 is shown comprising hardware elements that can be electrically coupled via a bus 605, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include, without limitation a mouse, a keyboard, a camera, and/or the like; and one or more output devices 620, which can include, without limitation a display device, a printer, and/or the like.

Computer system 600 may further include and/or be in communication with one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 600 might also include a communications subsystem 630, which can include, without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 630 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 630. In other embodiments, a portable electronic device, e.g., the first electronic device, may be incorporated into computer system 600, e.g., an electronic device as an input device 615. In some embodiments, computer system 600 will further comprise a working memory 635, which can include a RAM or ROM device, as described above.

Computer system 600 also can include software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general-purpose computer or other device to perform one or more operations in accordance with the described methods.

A set of these instructions and/or code may be stored on a non-transitory computer-readable storage medium, such as the storage device(s) 625 described above. In some cases, the storage medium might be incorporated within a computer system, such as computer system 600. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 600 and/or might take the form of source and/or installable code, which, upon compilation and/or installation on computer system 600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 600 to perform methods in accordance with various embodiments of the technology. According to a set of embodiments, some or all of the procedures of such methods are performed by computer system 600 in response to processor 610 executing one or more sequences of one or more instructions, which might be incorporated into the operating system 640 and/or other code, such as an application program 645, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally, or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for avoiding collisions with obstacles by a harvester, the method comprising:
    navigating a grain cart alongside the harvester, wherein the grain cart is pulled by a separate vehicle and the grain cart comprises an element for holding a crop harvested by the harvester, wherein the grain cart is navigated through an area outside the crop where the harvester has already harvested the crop, and wherein a lidar sensor is mounted on the separate vehicle and a radar sensor is mounted on the harvester;
    aiming the lidar sensor mounted on the separate vehicle at a path of the harvester, the path including the crop, and a field of view of the lidar sensor extending from the area outside the crop into the path of the harvester;
    detecting an object in the path of the harvester with the lidar sensor;
    determining a location of the object;
    transmitting the location of the object in the path of the harvester from a first communications module associated with the lidar sensor to a second communications module associated with the radar sensor;
    providing obstacle detection data with the radar sensor; and
    correcting obstacle detection data from the radar sensor using the location of the object from the lidar sensor.

2. The method of claim 1 further comprising:
    filtering sensor data from the lidar sensor to remove crop images.

3. The method of claim 1 further comprising:
    determining a proximity of the grain cart to the harvester using a proximity sensor mounted on either the harvester or the grain cart; and
    modifying the location of the object as determined by the lidar sensor based on the proximity.

4. The method of claim 3 wherein modifying the location includes converting a coordinate frame of the separate vehicle to a coordinate frame of the harvester.

5. The method of claim 1 further comprising fusing data from the lidar and radar sensors.

6. The method of claim 1 wherein the radar sensor on the harvester is a first radar sensor and the separate vehicle includes a second radar sensor, and further comprising fusing data from the first and second radar sensors.

7. A method for avoiding collisions with obstacles by a harvester, the method comprising:
    navigating a grain cart alongside the harvester, wherein the grain cart comprises an element for holding a crop harvested by the harvester, and wherein a lidar sensor is mounted on the grain cart;
    aiming the obstacle detection lidar sensor mounted on the grain cart at a path of the harvester, wherein the path includes the crop, and a field of view of the lidar sensor extends from an area outside the crop into the path of the harvester;
    obtaining data with the lidar sensor;
    detecting an object in the path of the harvester with the lidar sensor;
    determining a location of the object;
    transmitting the location of the object in the path of the harvester from a first communications module associated with the grain cart to a second communications module associated with the harvester;
    determining a proximity of the grain cart to the harvester using a proximity sensor mounted on either the harvester or the grain cart;
    modifying the location of the object as determined by the lidar sensor based on the proximity of the grain cart to the harvester;
    providing a radar sensor on the harvester;
    obtaining obstacle detection data with the radar sensor; and
    correcting obstacle detection data from the radar sensor using the location of the object from the lidar sensor as modified based on the proximity.

8. The method of claim 7 further comprising:
    filtering sensor data from the lidar sensor to remove crop images.

9. The method of claim 7 wherein modifying the location includes converting a coordinate frame of the grain cart to a coordinate frame of the harvester.

10. The method of claim 7 further comprising fusing the data from the lidar and radar sensors, wherein the fusing comprises weighting the data from the lidar and radar sensors based on noise determined using an infrared light beam and detector, and wherein the noise is determined based on dust interference with the lidar and radar sensors.

11. The method of claim 7 wherein the radar sensor on the harvester is a first radar sensor and the grain cart includes a second radar sensor, and further comprising fusing the data from the first and second radar sensors.

12. The method of claim 11 wherein the fusing comprises weighting obstacle locations detected by the first and second radar sensors.

13. A non-transitory computer-readable medium having stored thereon instructions that, when executed by one or more processors, cause the one or more processors to perform operations including:

navigating a grain cart alongside a harvester, wherein the grain cart comprises an element for holding a crop harvested by the harvester, wherein the grain cart is navigated through an area outside the crop where the harvester has already harvested the crop, and wherein a lidar sensor is mounted on the grain cart and a radar sensor is mounted in the harvester;

aiming the lidar sensor mounted on grain cart at a path of the harvester;

detecting an object in the path of the harvester with the lidar sensor;

determining a location of the object;

transmitting the location of the object in the path of the harvester from a first communications module associated with the grain cart to a second communications module associated with the harvester;

providing obstacle detection data with the radar sensor; and correcting the obstacle detection data from the radar sensor using the location of the object from the lidar sensor.

14. The method of claim 7 wherein the grain cart includes a pulling vehicle and the lidar sensor is mounted on the pulling vehicle.

15. The non-transitory computer-readable medium of claim 13 wherein the grain cart includes a pulling vehicle and the lidar sensor is mounted on the pulling vehicle.

* * * * *